(12) United States Patent
Hale et al.

(10) Patent No.: US 10,185,833 B2
(45) Date of Patent: *Jan. 22, 2019

(54) COMPLIANCE METHOD FOR A CYBER-PHYSICAL SYSTEM

(71) Applicant: The University of Tulsa, Tulsa, OK (US)

(72) Inventors: John Chandler Hale, Broken Arrow, OK (US); Peter Joseph Hawrylak, Tulsa, OK (US); Mauricio Jose Papa, Broken Arrow, OK (US)

(73) Assignee: The University of Tulsa, Tulsa, OK (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/263,045

(22) Filed: Sep. 12, 2016

(65) Prior Publication Data
US 2017/0004311 A1    Jan. 5, 2017

Related U.S. Application Data

(63) Continuation of application No. 14/433,907, filed as application No. PCT/US2013/026707 on Feb. 19, 2013, now Pat. No. 9,471,789.

(51) Int. Cl.
G06F 21/00      (2013.01)
G06F 21/57      (2013.01)
G06Q 50/00      (2012.01)
H04L 29/06      (2006.01)
G06Q 10/00      (2012.01)

(52) U.S. Cl.
CPC .......... *G06F 21/577* (2013.01); *G06F 21/00* (2013.01); *G06Q 10/00* (2013.01); *G06Q 50/00* (2013.01); *H04L 63/1433* (2013.01); *G06F 2221/034* (2013.01)

(58) Field of Classification Search
CPC .. G06F 21/00; G06F 21/577; G06F 2221/034; G06Q 50/00
See application file for complete search history.

(56) References Cited

U.S. PATENT DOCUMENTS 7,196,691 B1 * 3/2007 Zweig .................. G06F 3/0233
                                                    345/168
2010/0094611 A1   4/2010 Sankaranarayanan et al.
(Continued)

OTHER PUBLICATIONS

B. Bonakdarpour, Automated Addition of Fault Recovery to Cyber-physical Component-based Models, Oct. 9-14, 2011, IEEE, ISBN#978-1-4503-0714-7, pp. 127-136.*
(Continued)

*Primary Examiner* — Brandon S Hoffman
*Assistant Examiner* — Thong P Truong
(74) *Attorney, Agent, or Firm* — McAfee & Taft

(57) ABSTRACT

The present invention provides for analysis of cyber-physical systems with relation to compliance requirements such as regulatory compliance, maintenance compliance and safety compliance. Generally, the invention provides for a set of paths from an initial state to an end state, and analyzing the paths to determine which ones contain a violation state. Based on the resultant paths test scripts are generated. Additionally, other compliance related procedures can be performed utilizing the path analysis.

14 Claims, 6 Drawing Sheets

(56) References Cited

U.S. PATENT DOCUMENTS

2011/0231937 A1    9/2011  Lippman et al.
2012/0232679 A1    9/2012  Abercrombie et al.

OTHER PUBLICATIONS

Ajinka Bhave et al., "View Consistency in Architectures for Cyber-Physical Systems, In: Cyber-Physical Systems (ICCPS)", 2011 IEEE/ACM International Conference on, Apr. 12-14, 2011, Chicago, IL, pp. 151-160.

Fable Pasqualetti et al., "Attack Detection and Identification in Cyber-Physical Systems—Part 1: Models and Fundamental Limitations", Mar. 10, 2012, retrieved from http://arxiv.org/pdf/12026144.pdf, pp. 1-13.

International Search Report and Opinion from PCT/US2013/026707, dated Feb. 19, 2013.

European Search Report and Written Opinion from 13875879.2, dated Jan. 17, 2016.

George Robert et al, The University of Tulsa the Graduate School, "Hybrid Attack Graphs for Modeling Cyber-Physical Systems", Jan. 26, 2012.

Chee-Wooi Ten et al, "Vulnerability Assessment of Cybersecurity for SCADA Systems Using Attack Trees", Power Engineering Society General Meeting, Jun. 1, 2007.

Eric J. Byres et al, The Use of Attack Trees in Assessing Vulnerabilities in SCADA Systems, Aug. 20, 2004.

\* cited by examiner

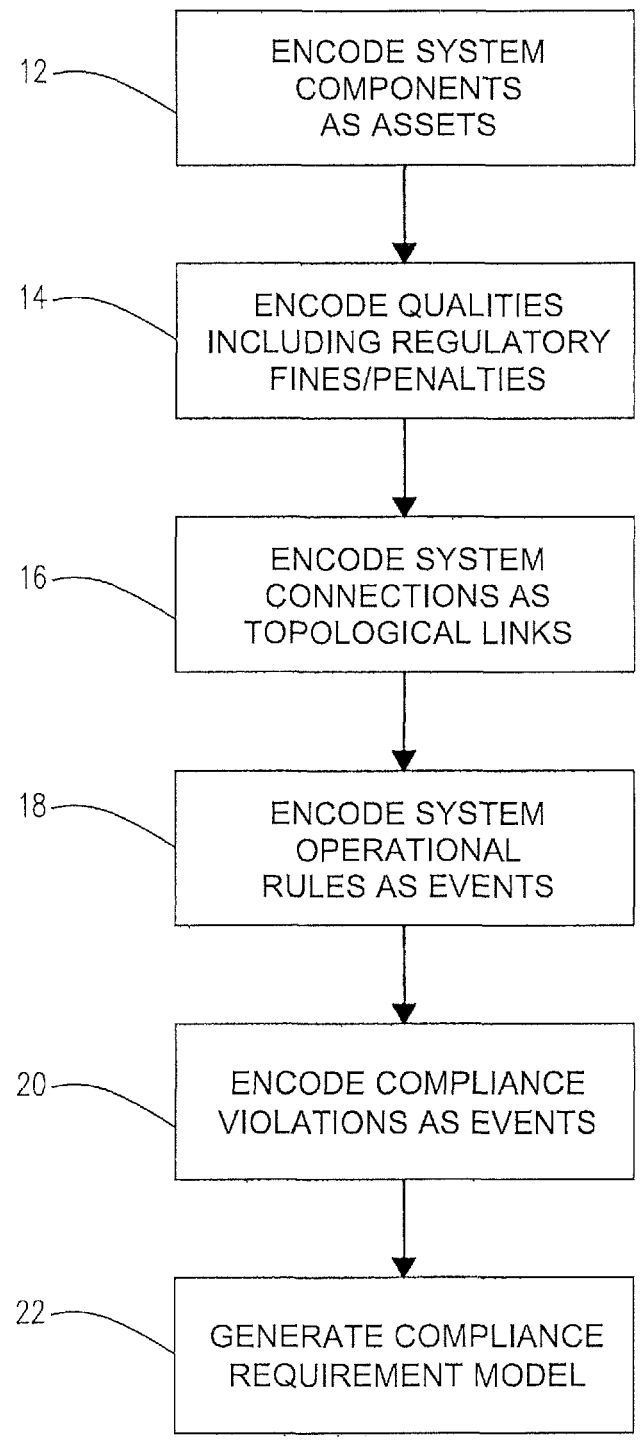
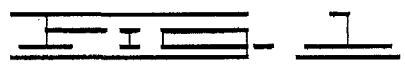

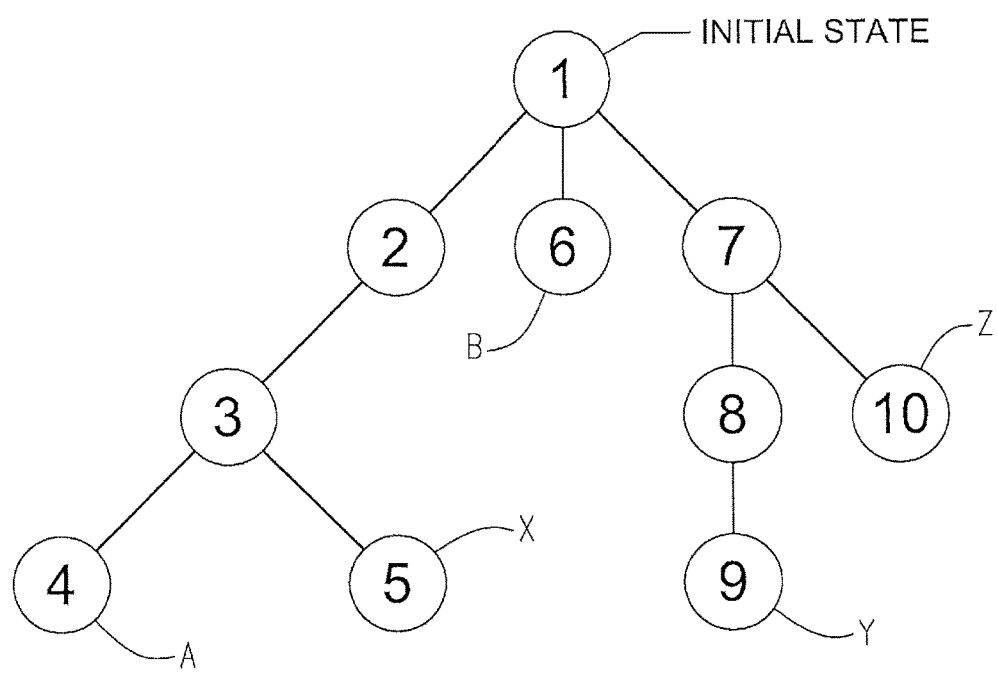
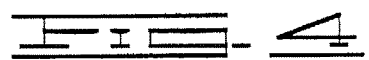

COMPLIANCE METHOD FOR A CYBER-PHYSICAL SYSTEM

CROSS-REFERENCE TO RELATED APPLICATIONS

This application is a continuation of U.S. patent application Ser. No. 14/433,907 filed Apr. 7, 2015, now allowed, and claims the benefit of PCT/US2013/026707 filed Feb. 19, 2013. Both of which are hereby incorporated by reference.

STATEMENT AS TO FEDERALLY SPONSORED RESEARCH

This application was supported in part by a contract, Agreement Number FA8750-09-1-0208, from the Defense Advanced Research Projects Agency. The United States Government may have rights in, and to, this invention by virtue of this funding.

BACKGROUND OF THE INVENTION

1. Field of the Invention

The invention relates to compliance programs in cyber-physical systems and specifically to compliance programs such as regulatory, safety and maintenance compliance programs.

2. Description of Related Art

Systems wherein computers interact with each other and the physical world have become more pervasive. Such systems comprise a networked computer system that is proximately coupled to the physical world; thus, having both discrete (digital) components and continuous (physical) components and are called hybrid systems or cyber-physical systems. Examples of hybrid systems abound in industrial controls and critical infrastructure.

As such hybrid systems continue to be developed, it has become important to protect them from security concerns, i.e. cyber-attackers attacking the computer network by exploiting vulnerabilities on the cyber side. In cyber systems such attacks frequently cause damages such as denial of service and theft of corporate, personal or governmental secrets. In cyber-physical systems, the same damages as for cyber systems are of concern but also an additional new damage element of affecting the physical domain is present, such as stopping equipment functioning or changing the operation parameters of equipment so as to adversely affect its function.

In addition to security, hybrid systems have operational concerns. As distinguished from security concerns, operational concerns are focused on ensuring that equipment operates within maintenance, safety, regulatory and other compliance requirements. While some operational concerns can be the result of cyber-attack (a cyber-attacker changing an operating parameter, for example) others are purely operational with no security element (faulty sensor allows for running equipment at too high of a temperature, for example).

Presently, testing operating concerns is accomplished by an engineer or other skilled professional, writing test scripts by first studying and understanding the relevant regulatory, safety, maintenance and other compliance information as well as the physical side and potentially the cyber side of the hybrid or cyber-physical system. Such test scripts are necessary for the normal operation of the physical side to keep it in compliance with compliance requirements and for changing or upgrading the physical equipment, which may necessitate preparing different test scripts from those required for previous operation. Accordingly, a more automated system for generating compliance test scripts and for determining the compliance concerns related to equipment replacement and upgrades would be advantageous.

SUMMARY OF THE INVENTION

In accordance with one embodiment of the current invention there is provided a method of adjusting a cyber-physical system having a plurality of components. The method comprises (a) describing each of the plurality of components and defining at least one compliance penalty as a quality associated with at least one component of the plurality of components wherein the compliance penalty results from at least one component being noncompliant with a compliance requirement;

(b) defining an initial state for the cyber-physical system;

(c) generating a set of paths, wherein each path comprises at least one event necessary for transition from the initial state to an end state, which transition can include passage through one or more intermediate states in transit from the initial state to the end state;

(d) identifying a set of violation paths from the set of paths, each violation path contains at least one violation state in which the at least one component is noncompliant with the compliance requirement;

(e) identifying the compliance penalty associated with the violation state; and (f) adjusting the cyber-physical system to prevent the compliance penalty.

In accordance with another embodiment of the current invention there is provided a method of generating test scripts for compliance in a cyber-physical system. The method comprising:

(a) generating a hybrid compliance graph utilizing at least one compliance penalty as a quality of a component of the cyber-physical system; at least one operational rule as an event and at least one compliance violation as an event, wherein the compliance penalty results from the component being noncompliant with a compliance requirement;

(b) searching the hybrid compliance graph for a path from an initial state to a violation state selected from a group of violation states where, for each violation state in the group, the component is noncompliant with the compliance requirement;

(c) if a path is found in step (b), adding the path to a list of violation scenarios;

(d) repeating steps (b) through (c) for each violation state in the group of violation states; and (e) generating test scripts from the list of violation scenarios.

In accordance with a further embodiment of the current invention there is provided a computer implemented method of checking the validity of a compliance test for a cyber-physical system. The method comprising:

(a) generating a hybrid compliance graph utilizing at least one compliance penalty as a quality of a component of the cyber-physical system, at least one operational rule as an event, at least one compliance violation as an event, and at least one test condition as an event, wherein the compliance penalty results from the component being noncompliant with a compliance requirement and wherein at least one test condition is associated with the compliance test for the cyber-physical system;

(b) searching the hybrid compliance graph for a path from an initial state to a violation state associated with the compliance test; and (c) determining whether the compliance test is valid based on the existence of the path.

In accordance with yet another embodiment of the current invention there is provided a method of changing a first component of a cyber-physical system comprised of components, which include the first component and a plurality of other components, and a set of connections between the components. The method comprising:

(a) identifying the first component in the cyber-physical system;

(b) generating a hybrid compliance graph utilizing at least one operational rule as an event, and at least one compliance violation as an event, wherein the operational rules are at least partially based on operational changes resulting from changing the first component;

(c) searching the hybrid compliance graph for a path from an initial state to a violation state associated with changing the first component; and (d) if the path is found, adjusting the cyber-physical system so that the violation state will not occur.

In accordance with still another embodiment of the current invention there is provided a method of generating a hybrid compliance graph for a cyber-physical system having a plurality of components. The method comprising:

(a) describing each of the plurality of components and defining at least one compliance penalty as a quality associated with at least one component of the plurality of components and wherein the compliance penalty results from at least one component being noncompliant with a compliance requirement;

(b) defining an initial state for the cyber-physical system;

(c) generating a set of paths, wherein each path comprises at least one event necessary for transition from the initial state to an end state, which transition can include passage through one or more intermediate states in transit from the initial state to the end state;

(d) identifying a set of violation paths from the set of paths where each violation path contains at least one violation state in which at least one component is noncompliant with the compliance requirement;

(e) generating from the set of paths a hybrid compliance graph illustrating the paths from the initial state to the violation state.

BRIEF DESCRIPTION OF THE DRAWINGS

FIG. 1 is a diagram illustrating a process to encode the system information and the regulatory and compliance requirements into the assets data file and event data file formats to create the model in accordance with an embodiment of the current invention.

FIG. 4 is a diagram illustrating an example of a depth-first search as it applies to hybrid compliance graphs of the current invention.

DESCRIPTION OF EMBODIMENTS

1. Overview

Figure 2:
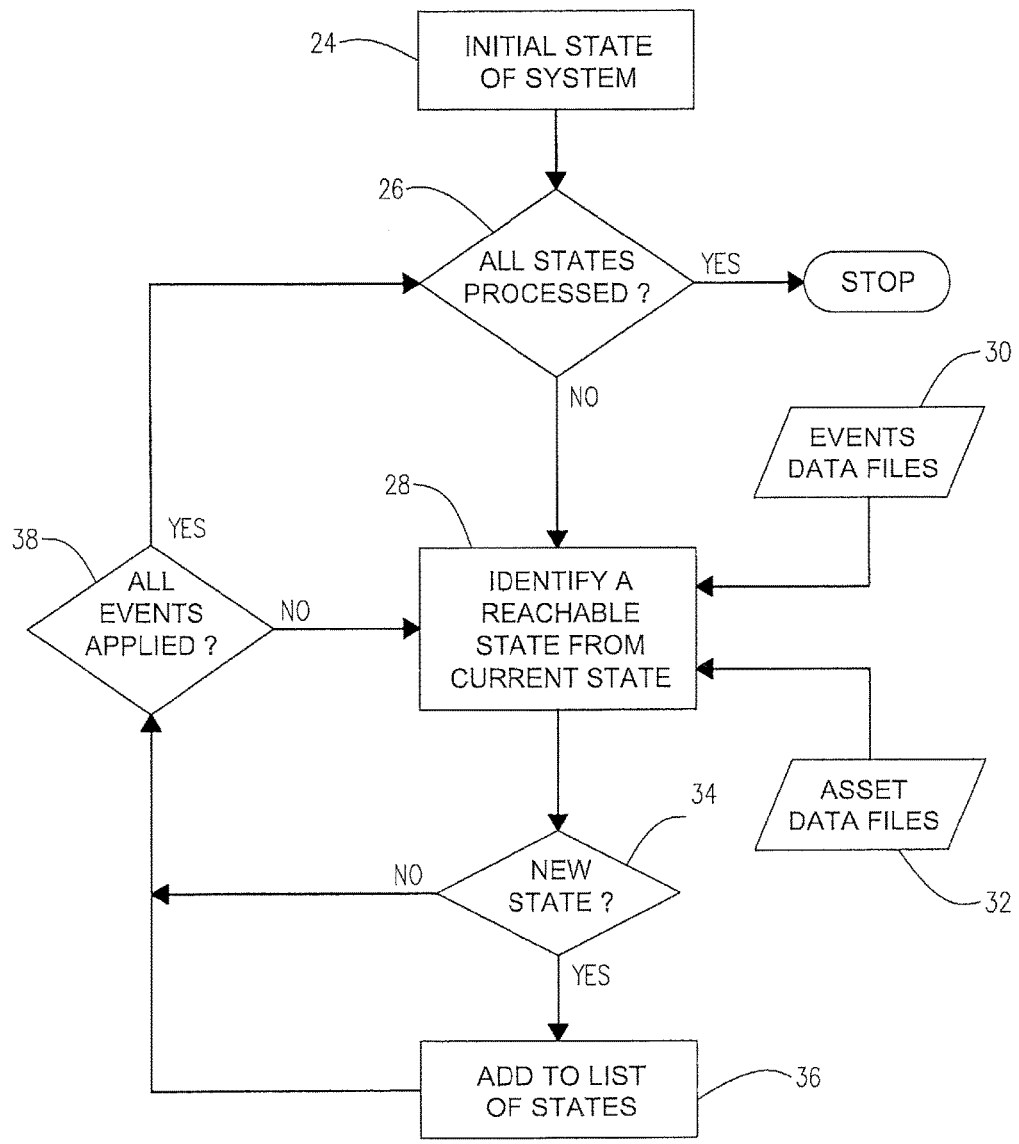
FIG. 2 is a diagram illustrating a process for generating the hybrid compliance graph from an event data file, an asset data file and an initial state in accordance with an embodiment of the current invention.

Attack graphs use graph theory to model attacks and their interactions on networks of computer systems. An attack graph is one of several related formalisms that utilize graph theory to model the state space of computer system attacks with interacting elements. Attack graphs utilize computer system modeling to show how an initial set of system parameters or preconditions could undergo a series of exploitations to arrive at one or several alternative final system states or post-conditions. Attack graphs and methods of generation, such as recorded in U.S. Pat. No. 7,971,252, are known in the art and have been utilized with respect to modeling of computer networks for purposes of analyzing system vulnerabilities with respect to cyber attacks.

Attack graphs have been structured to model strictly cyber systems and attacks on such systems by a cyber attacker. They model a system's security-relevant state space, in which vertices represent system states and edges represent state transitions, typically caused by the actions of an adversary or cyber-attacker. Their use permits an exploration of a system's state space in a manner that takes into account the interactions among security vulnerabilities on interconnected systems.

In an attack graph, the nodes are states and the edges are transitions, meaning each edge is a bound attack. Attack graphs typically specify attack patterns (or attack exploits) as sets of preconditions and post-conditions. Matching preconditions with the system model for a state or node and mapping the post-conditions back onto the model permits the identification of an attack's successor states. Attack graph generation is the process of chaining attack exploits to states to enumerate the attack space.

Traditional, attack graphs are limited to discrete components, for example turning a computer on or off or accessing files on a server. Accordingly, attack graphs cannot account for physical components, which are continuous components, for example the overheating of a transformer, which depends on changes in environmental temperature and heat generated over time by the transformer. As discussed above, a cyber-physical system is a network hybrid system; that is, a networked computer system that is proximately coupled to the physical world. Accordingly, existing frameworks for modeling and analysis of purely discrete computer networks are inappropriate for use in cyber-physical systems because of their inability to capture the continuous domain; they also lack a robust notion of time. Likewise, modeling methods from the world of isolated control systems cannot model the complex distributed networks that are the hallmark of cyber-physical systems.

More recently, attack graphs have been expanded to apply to cyber-physical systems in what is termed hybrid attack graphs. For example, G. Louthan, P. Hardwicke, P. Hawrylak and J. Hale, "Toward hybrid attack dependency graphs," *CSIIRW'11, Proceedings of the Seventh Annual Workshop on Cyber Security and Information Intelligence Research*, Article No. 8. Also, Hawrylak, Peter J.; Haney, Michael;

Papa, Mauricio; and Hale, John, "Using Hybrid Attack Graphs to Model Cyber-Physical Attacks in the Smart Grid," 2012 5$^{th}$ *International Symposium on Resilient Control Systems* (ISRCS), pp. 161-164.

Various techniques are used in generating these hybrid attack graphs to account for the continuous components, such as quantizing time so that continuous components can be accounted for in sets of preconditions and post-conditions.

2. Exemplary Embodiments

In accordance with the invention, hybrid attack graphs are now further expanded to account for not only security issues of cyber-physical systems, i.e. cyber attacks on the cyber-physical system, but also to account for the compliance of the cyber-physical system. As used herein "compliance" refers to compliance with regulatory, maintenance, safety and other such requirements that may have an impact on the safety or efficiency or may result in penalties, fines, legal sanctions or may shutdown the cyber-physical system. Additionally, while "compliance" will not refer to security issues, the techniques described herein can be combined with security techniques to address both compliance and security issues. As such, the graphs are no longer limited to just security issues and will generally be referred to as hybrid compliance graphs herein; although, the hybrid compliance graphs can be directed to either compliance alone or to both security and compliance.

Hybrid compliance graph work for the invention can be considered to fall into three broad phases, referenced throughout this work by the following names: modeling, generation, and analysis.

In the modeling phase, the cyber-physical system is defined or represented by a system of assets, qualities and topologies. Assets are the components of the cyber-physical system; that is, the assets are the things in the cyber-physical system such as servers, computers, equipment or machines. In security issues, assets can also be an attacker or a document contained on the cyber side. In compliance issues, assets also can be any machine or equipment such as centrifuges, transformers and sensors. The qualities represent the properties of each asset. Qualities can be software packages or versions or whether a computer is offline, online or in sleep mode. Further, with regard to equipment and machines, the qualities can be whether it is on or off, in need of maintenance, operating temperature range, current gas emissions and the like. Topologies represent relationships between two assets. Topologies bind an asset to another asset through a relationship. For cyber-physical systems, component topologies can be network connections between cyber components, access level of cyber components, stop/start connections between sensors and other equipment, and the like.

Qualities and topologies are associated with assets, which are uniquely identified. Qualities and topologies make up the cyber-physical systems collection of facts, or fact base. The fact base combined with the asset collection fully describe the cyber-physical system's state. Given a constant asset collection, a state is uniquely described by its fact base, which is all the qualities and topologies that are valid for that state.

In the modeling, an initial state is defined for the system. The initial state is evolved for actions and time using event patterns to generate new states, or successor states. Event patterns, also called events, are general templates for how actions and time can alter the system state by inserting and removing qualities and topologies (but not assets). They are written as functions that take parameters corresponding to assets, are guarded by preconditions, and specify a set of post-conditions (insert and delete actions on qualities and topologies to update the fact base and therefore generate new network states). Generally, the post-conditions of one state are the precondition of another state, or successor state.

FIG. 1 shows a process to encode the system information and the regulatory and compliance requirements into the assets data file and event data file formats to create a compliance requirement model that is then used to generate the hybrid compliance graph. The hybrid compliance graph is then used to evaluate the system for compliance violations and/or vulnerabilities.

In step 12 the assets data file is constructed and encoded with the cyber-physical system components as assets. Each component, whether a cyber component or a physical component, is described or represented in the assets data file with a unique identifier. As indicated above, the components can be cyber components, such as computers, servers and the like, or can be physical components or equipment, such as sensors, burners, boilers, etc.

Qualities associated with the assets are described or encoded in step 14. The assets data file is encoded to include the qualities associated with each asset such as behavioral properties to describe each asset's functions, limitations on operating ranges, current operational conditions, performance criteria and similar (e.g. operating system, high temperature alarm limit, current operating temperature, etc). More specifically for the invention these qualities include fines, regulatory penalties, legal sanctions, downtime and/or other consequences for violations of regulatory, safety maintenance or other compliance violations. For example a quality could be a fine associated with a regulatory violation of equipment in the cyber-physical system not meeting regulatory emissions requirements, or a quality could be the downtime, equipment replacement cost and the like for maintenance violations. Throughout this disclosure such consequences for violations will be referred to as "compliance penalties" and will include fines, regulatory penalties, legal sanctions, downtime and/or other consequences for violations of compliance requirements. Additionally, if security issues are included in the model, qualities can include attacker target and initial attacker access. Generally security issues will be limited to those that generate compliance violations and, hence, result in compliance penalties.

The assets topology is described or encoded in step 16. As described above, the topology is the connection or relationship between assets in the cyber-physical system, in other words, the way such assets interact with each other, such as one way communication or bidirectional communication. Generally, the topology will be encoded in the assets data file along with the assets and qualities. Thus, the assets data file consists of a list of the assets (things) in the cyber-physical system, operational qualities of each asset, compliance penalties types of each asset as qualities and the connections between assets as topology.

The events data file is created and encoded with system operational rules, which can include security rules, step 18, and with compliance violations, step 20. Accordingly, the operational modes and behaviors of the system are modeled as events such that the events data file can be encoded with such operational modes and behaviors as operational rules. While these are normal or allowed actions by the system they are modeled as events to allow a chain of normal operations to precede or follow the passage of time through quantitized time increments. More particularly, the events for security attacks will be ones that can result in a non-compliant state for the cyber-physical system or a component thereof. The pre-conditions for each event documents the conditions under which a particular behavior can occur. The post-conditions identify how the system changes in response to each event. Generally, post-conditions are either deletion or insertions of qualities. As mentioned above, the post-conditions can serve as preconditions for subsequent states. Accordingly during generation as described below, the preconditions will be matched to a state. If the preconditions match that state then the state will be changed by the post-conditions to generate a successor state.

In step 20, the pre-conditions for the compliance events document conditions in the system leading to noncompliance. Post-conditions will update the system state in response to the action and will increase the quality representing the overall penalty or some other metric representing the level of noncompliance of the system. For hybrid compliance graphs directed at compliance for cyber-physical systems, the overall resulting state from each of the compliance violation events represents a goal state, i.e. the violation state.

Generally for security issues, the preconditions can be a particular type of cyber attack and would match with a state, if that state is susceptible to such attack. The post-conditions for the cyber attack would be the changes that occur to the system after such an attack is made. For example, a cyber-physical system could have an initial state of a cyber component with a precondition of a weak SSH public key and the behavior that occurs for this precondition is an attack, which finds a private key using the week SSH public key. Accordingly, the post-condition would be logging in the cyber component as a user using the private key. The goal state of the cyber attack could be accessing encrypted documents, obtaining root access to the cyber network or a component thereof.

Generally for compliance issues, the preconditions can be operational modes and rules or can be violation modes and rules. The post-conditions would be changes that occur to the system after application of such modes and rules. For example, an equipment component may have a quantity defining a temperature at which overheating occurs. The precondition would be the current temperature of the equipment component; the behavior would be an increase in temperature due to operational time of the equipment component without cooling; the post-condition would be an increase in temperature. When combined with the encoded compliance violations, the goal state might be exceeding the overheating temperature, which would indicate a compliance violation such as a maintenance violation of the heat sensors that control a cooling fan. To the extent security events are incorporated in the cyber-physical compliance model, generally they would be cyber attacks that result in a goal state of placing the cyber-physical system in compliance violation. In the above example, they could be cyber attacks leading to sensors misreading the component temperature and, thus, causing component over heating.

Generally, steps 12, 14, 16, 18 and 20 represent constructing the compliance requirement model. Steps 12, 14, 16, 18 and 20 can be performed in any order. Once the model has been prepared and encoded, the hybrid compliance graph can be generated in the generation phase, step 22. Generation of the hybrid compliance graph is the process of building a graph out of the model by closing the state space over its events. This is where most performance work is concentrated. The work that enables a representation of time is shared between the generation phase and the modeling phase. Constraints (such as monotonicity) on the progression of state transitions also fall under the generation category.

Turning now to FIG. 2, a process for generating the hybrid compliance graph from an event data file, an asset data file and an initial state can be seen. The initial state, or starting state, is defined in step 24. The initial state is defined by one or more preconditions for the components of the cyber-physical system that dictate the initial state's assets and qualities.

In step 26, it is determined if all states have been processed. For the initial state, typically all states have not been processed; if they have been, then the model is analyzed for errors. Next in step 28, information is obtained from the event data file 30 and the asset data file 32. The events having preconditions associated with the initial state are applied to the initial state to identify a new state, or successor state, reachable from the initial state. The asset data file contains a list of assets (things) in the system, the qualities or properties associated with each asset, and the topology between assets. The event data file contains a list of events that require a set of preconditions to be true before they can be executed. Each event has associated with it, a set of post-conditions that represent and document the changes the event makes to the current system state. The post-conditions generate the successor state. Subsequently, the successor state is examined against a list of states in step 34 to determine if it has been previously identified. If this state has not been identified previously, it is added to the list of states in step 36. If the successor state is already in the list of states, then it is not added but an edge is added from the current state to that new state and the process moves to step 38 to try to apply additional events. Upon completion of step 36, it is determined if all events have been tested for the initial state in step 38. Since the same set of preconditions can be associated with multiple sets of post-conditions, especially as the complexity of the cyber-physical system increases, it is possible to have multiple events apply to any state and, thus, generate multiple successor states from a single current state. Accordingly, if further events apply to the initial state, these are further processed in step 28 to see if further successor states are reachable. If no further events apply, it is determined if all states have been processed in step 26. If all states have not been processed, a successor state from the list of states is used as the current state and events are applied to it in step 28 to identify any successor state reachable from this current state. This next successor state is then examined against the list of states in step 36 to determine if it has been previously identified. Similar to the initial state, all applicable events are applied to the current state and any new states are added to the list of states. After the events are applied to the current state, the current state is changed to the next state in the list. The process continues on in this manner until all states have been processed. Accordingly, the process can terminate once all states in the list have been processed. Optionally, the process can terminate when each path from the initial state results in an end state which meets predetermined criteria. For example, an end state can be set to be (1) when all states for a particular path have been processed or (2) when a predetermined number of states in a path has been reached, whichever occurs first. The predetermined number of states can be determined by a predetermined number of event applications to states along a path. Thus, where events involve a quantized increase in time, the number of states in a path may be limited by reaching a predetermined time after the initial state. Accordingly, the hybrid compliance graph would end when each path has either (1) no more states or (2) has generated a number of states equating to the predetermined time after the initial state. Additionally, an end state criteria could include that a path ends if a goal state is reached. A goal state is a state where the cyber-physical system is in compliance violation. A non-goal state is a state where the cyber-physical system is not in violation. Accordingly, with this last criteria added, the hybrid compliance graph would end when each path (1) has no more states, (2) has reached a goal state or (3) has generated a number of states equal to the predetermined time after the initial state.

The list of states and the path, or edges, joining them comprise the hybrid compliance graph and can be displayed in a graph structure. The graph is next analyzed to determine if the cyber-physical system meets regulatory, safety, maintenance or other compliance requirements and can be analyzed for security requirements too, if such security events have been included in the generation of the hybrid compliance graph. Generally, such an analysis comprises determining that the goal states can be reached and then evaluating the paths from the initial state to the goal state.

Figure 3:
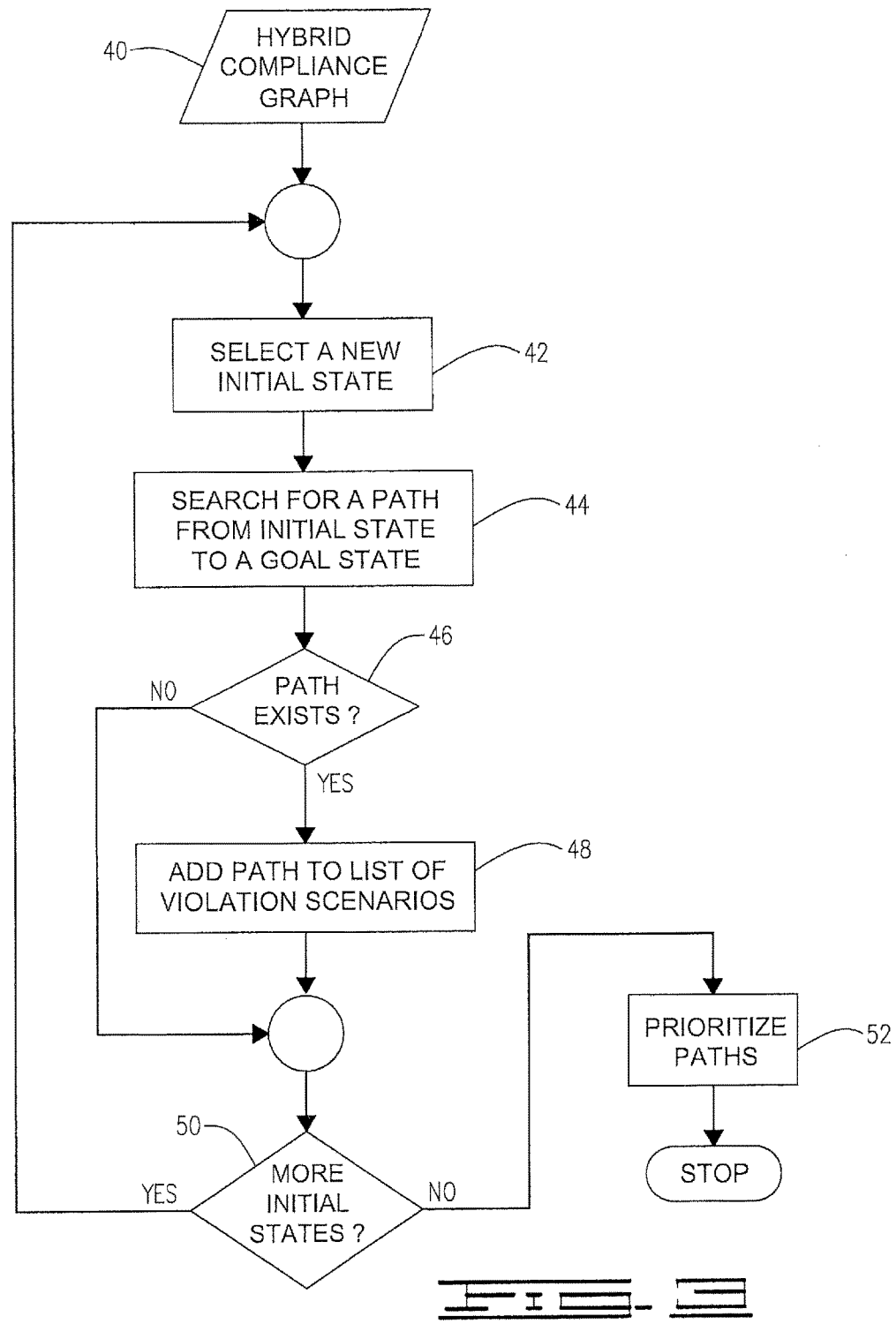
FIG. 3 is a diagram illustrating an algorithm in accordance with an embodiment of the current invention. The algorithm analyzes a hybrid compliance graph to determine if the cyber-physical system meets compliance requirements.

Turning now to FIG. 3, the analysis phase is illustrated. More specifically, FIG. 3 illustrates an algorithm to analyze the hybrid compliance graph 40 generated by a process such as that illustrated in FIG. 2 to determine if a cyber-physical system meets compliance requirements. The process begins at step 42 by selecting an initial state from a set of one or more initial states of the cyber-physical system. Generally, there will only be one initial state but it is within the scope of the invention for there to be multiple initial states. Then the hybrid attack graph is searched for paths from this initial state to one or more goal states or violation states in step 44. Several path searching algorithms can be used, with depth-first search and breadth-first search being exemplary. Both depth-first search and breadth-first search are computationally efficient algorithms for finding the set of paths from an initial state to the goal states and are further explained below.

Each path from the initial state to one or more goal states ("violation path") represents a scenario or sequence of events that can lead to a compliance violation. In other words, each such violation path represents a series of transitions from the initial state through a set of one or more intermediate states to one or more goal states, or violation states. Often a path will be set to end if a goal state is reached; that is, goal states are set to be end states. In such cases each violation path would lead to only one goal state. It is within the scope of the invention, that goal states would not be set as an end state; thus, a path could have several goal states before reaching an end state.

If a violation path is determined to exist in step 46, the path is added to a list of violation scenarios in step 48 and then the process goes to step 50. If it is determined in step 48 that no violation path exists, then the process goes directly to step 50. In step 50, it is determined if there are additional initial states. This process iterates for each initial state. Often systems will have a single initial state. Upon completion of identification of the violation paths, the paths found are prioritized in step 52. The paths in the list of violation states are prioritized by one or more priority criteria. Priority criteria can include hazard level of the violation state, penalty type of the violation state (such as the monetary cost of a penalty) and effect on one or more user-specified components of the cyber-physical system. The resultant path analysis can be printed or displayed in a user-readable output form showing either one or more paths to a violation state or reporting no identified paths to an unsafe state. Additionally, the paths can show the priority level by alpha-numeric labels, color, listing or any other suitable form.

As indicated above, two exemplary path searching algorithms are depth-first search and breadth-first search. In a depth-first search, the graph is searched starting at the initial state, going to the first child state that appears, then to the first grandchild state that appears, and continuing in this manner until a state with no children is reached (an end state). At this point, the search backtracks returning to the most recent state that it has not finished exploring and going to the next unexplored child state of that state. Each state is also checked to see if it is a goal state. If there is a goal state in the path, then the path will be recorded in the list of paths, also called the list of violation states. An example of depth-first search as it applies to hybrid compliance graphs is illustrated in FIG. 4. In the example illustrated in FIG. 4, goal states are end states; thus, only end states need to be checked as violation states. In FIG. 4, the numbers represent the order of the search; final states A and B represent non-goal end states; and goal states X, Y and Z represent goal states or violation states for the cyber-physical system.

Figure 5:
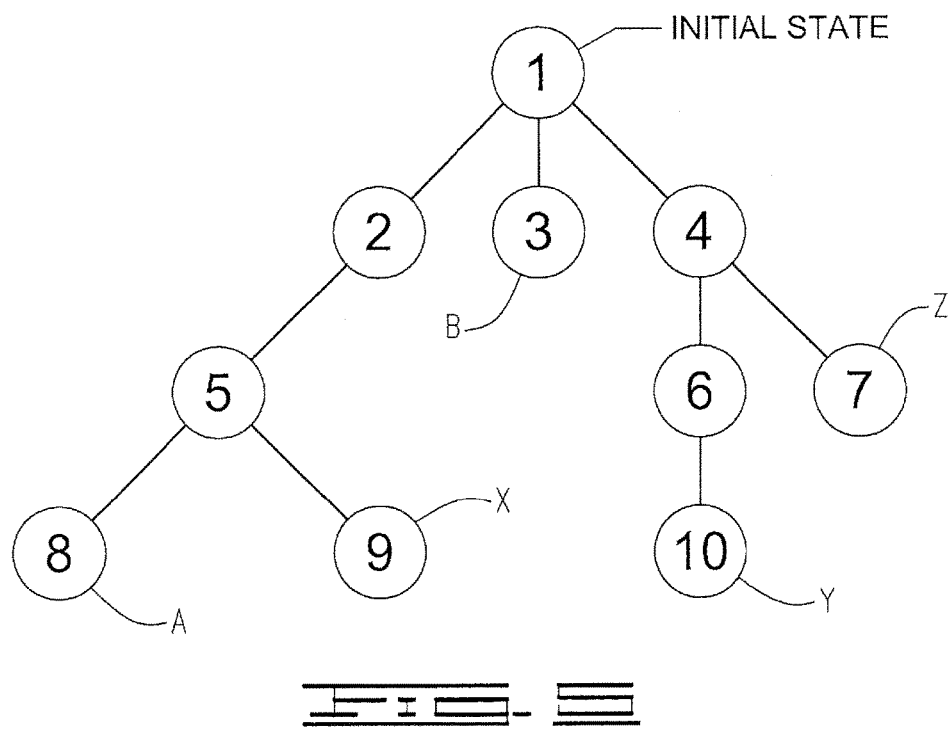
FIG. 5 is a diagram illustrating an example of a breadth-first search as it applies to hybrid compliance graphs of the current invention.

In a breadth-first search, the graph is searched starting at the initial state, identifying each child state that appears, then identifying each grandchild state that appears, and continuing in this manner until a level is reached where no state has a child state. Again, each state is checked to see if it is a goal state. If so, then the path will be recorded in the list of paths or list of violation scenarios. An example of breadth-first search as it applies to hybrid compliance graphs is illustrated in FIG. 5. In the example illustrated in FIG. 5, goal states are end states; thus, only end states need to be checked as violation states. In FIG. 5, the numbers represent the order of the search, final states A and B represent non-goal end states and goal states X, Y and Z represent goal states or violation states for the cyber-physical system.

The identified paths in the list of paths represent sequences of actions that can cause a compliance violation in the cyber-physical system. These sequences of conditions, actions, and/or events can be collected into a test-case or test script that is used to test the cyber-physical system to determine whether or not it handles these conditions appropriately and does not enter one of the goal states. These test-cases or test scripts can be translated into the appropriate control language for a piece(s) of testing equipment whose purpose is to verify compliance of a system with respect to some aspect. The identified paths will include the conditions, actions, and/or events that may cause one or more compliance violations. The translation converts the conditions, actions, and/or events in the test-case or test script into the commands to execute the test-case or test script using the control language of the testing equipment. The translation is customized to each model of testing equipment and is similar to a computer device driver. The testing equipment executes the commands provided in its control language to impose these conditions, actions, and/or events on the system in question, and monitors the system to determine if a compliance violation has occurred. In the event no path exists from the initial state to a particular goal state, the system in question is shown not to be affected by the violation or vulnerability represented by that goal state. Accordingly the test scripts can be used to determine whether the cyber-physical system can become noncompliant with a compliance regulation.

In accordance with the above, in one embodiment according to the current invention there is provided a method for systematically identifying compliance issues in a cyber-physical system having a plurality of components. In the method, first a compliance requirement model for the cyber-physical system is constructed in which each of the components is defined. Also, the qualities associated with components are defined including at least one compliance penalty as a quality associated with at least one of the components. The compliance penalty results from the associated component being noncompliant with a compliance requirement. Next one or more initial states are defined for the cyber-physical system. Afterwards a set of paths are generated, wherein each path comprises at least one event necessary for transition from one of the initial states to an end state. The transition can include passage through intermediate states in transit from the initial state condition to the end state. After generation of the paths, those paths where the end state is a violation state are identified. A violation state being where at least one component is noncompliant with the compliance requirement. The identified paths can be further identified or sorted by the compliance penalty associated with the violation state. Finally, the cyber-physical system is adjusted so as to prevent the compliance penalty, i.e. to prevent the component(s) becoming noncompliant by means of the indentified path. Generally, at least a portion of the steps of the method will be computer implemented steps. Typically, at least the steps of generating the set of paths; identifying the paths having a violation state as an end state; and identifying the compliance penalty associated with the violations state and/or sorting the paths by compliance penalty will be computer implemented.

In another embodiment, the inventive method is used to check the validity of compliance test generated separate from the inventive method, or a pre-existing compliance test. A hybrid compliance graph is generated, as outlined above, for a cyber-physical system utilizing as one or more compliance penalties as qualities; one or more operational rules as events and one or more violations as events and test conditions of the pre-existing compliance test as events. The resulting hybrid compliance graph is then searched for any paths from an initial state to a violation state wherein the violation state is one associated with the pre-existing compliance test. If such a path exists, then the pre-existing compliance test is valid. If such a path does not exist, then the pre-existing compliance test is invalid.

In another embodiment, the inventive method is used in making equipment or component changes to cyber physical systems. The changes can be equipment upgrades, replacements or additions. In the method, the equipment to be changed in the cyber-physical system is first identified ("original equipment"). Such identification includes identifying what the equipment change will be, i.e. the pieces of equipment affected and what the new or upgraded equipment will be and how it will operate. Next a hybrid compliance graph is generated as outlined above utilizing one or more compliance penalties as qualities; one or more operational rules as events and one or more violations as events and test conditions as events. The operational rules are at least partially based on operational changes resulting from the piece of equipment being changed. The generated hybrid compliance graph is then searched for a path from an initial state to a violation state associated with the piece of equipment being changed. If such a path exists, the cyber-physical system is adjusted so that the violation state will not occur. Such adjustment includes upgrading or replacing additional equipment in the cyber-physical system, changing the relationships or connections of the assets of the cyber-physical system, using a different equipment upgrade, replacement or addition, or reinstating the original equipment.

3. Example

The above-described method of generating hybrid compliance graphs was applied to a simplified electric power substation switching system. Electric power substations have two essential components: main or primary circuits carrying high voltage and auxiliary or secondary circuits. The main circuit is composed of a busbar system (three low impedance conductors) and components that facilitate its connection to power lines, power transformers and others through switching equipment. Electric substations are divided into bays containing not only switching components (to connect power lines) but also all the components needed for protection, control and measurement. Bays are named according to their use, e.g., a transformer bay connects the power line to a transformer. Auxiliary or secondary circuits contain measurement, signaling, control and protection devices.

From a cyber security point of view and for safety reasons, it is imperative to protect the SCADA (Supervisory Control and Data Acquisition) system responsible for switching control in a substation. Their main task consists of responding to events and commands by following a carefully designed sequence of actions, i.e., operation of relays, breakers, disconnectors to isolate a circuit. Disconnectors, for instance, are designed to switch on and off very small currents and are typically used to provide isolation clearance between disconnected parts of circuit breakers.

Figure 6:
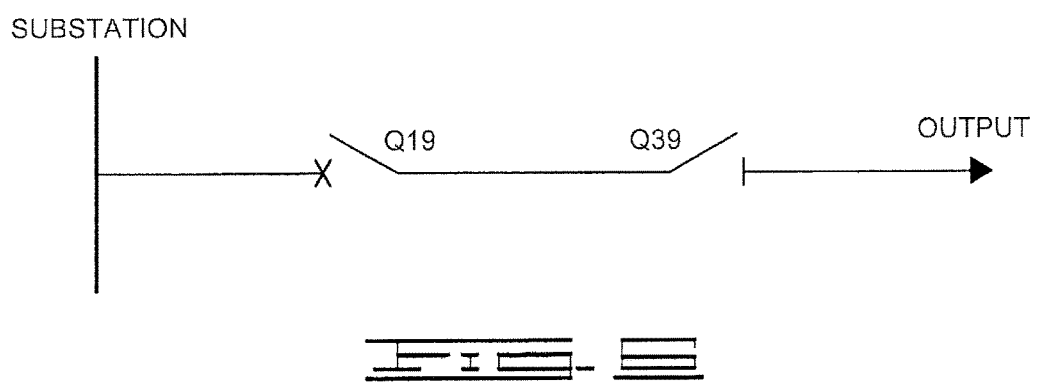
FIG. 6 is a schematic illustration of a simplified electric power substation switching system modeled in the Example.

For the example, a busbar connected in a substation bay as illustrated in FIG. 6 was considered. In the busbar, Q39 was a disconnector and Q19 was a breaker (the disconnector between the substation and Q19 is not shown in FIG. 6 for simplicity). In this case, and due to restrictions in the disconnector, a line should be switched off following this two step sequence:

1. break current using Q19 (open Q19), and
2. open line disconnector Q39 to isolate the line from the breaker.

Further, the disconnector (Q39) must be opened at least 2 ms (milliseconds) after the breaker (Q19) to allow ample time for the line to discharge. If the disconnector (Q39) is opened within 2 ms of the breaker (Q19) being opened then an arc may result. This condition must be avoided. These requirements resulted in two regulations (rules) that must be followed.

Regulation 1: The breaker (Q19) must be opened before the disconnector (Q39) is opened.
Regulation 2: The disconnector (Q39) must be opened at least 2 ms after the breaker (Q19) is opened.

Operation of these components typically occurs by sending appropriate commands over a network. Accordingly, for the Example incorrect operation of the components could happen as a result of a security cause or a non-security cause. If an intruder were to attack the network in such a way that the sequence of operations was not followed, this could cause major damage. For instance if disconnector Q39 was opened first, this would cause an electric arc that would look like a small explosion. This could happen by having an intruder bypass access control mechanisms to access an IED (Intelligent Electronic Device) or by gaining access to the network and manipulating messages directly. Such an intruder attack, which causes a failure, is a security cause. Alternatively, the incorrect operation of components could be the result of something other than an intentional attack. For example, a fault could result from an unintentional mistake (human error), a non-attack related fault (e.g. a faulty piece of hardware), or an operations procedure that lacks one or more safeguards that could prevent the incorrect operation of components. Such an unintentional cause, which causes a failure, is a non-security cause.

Figure 7:
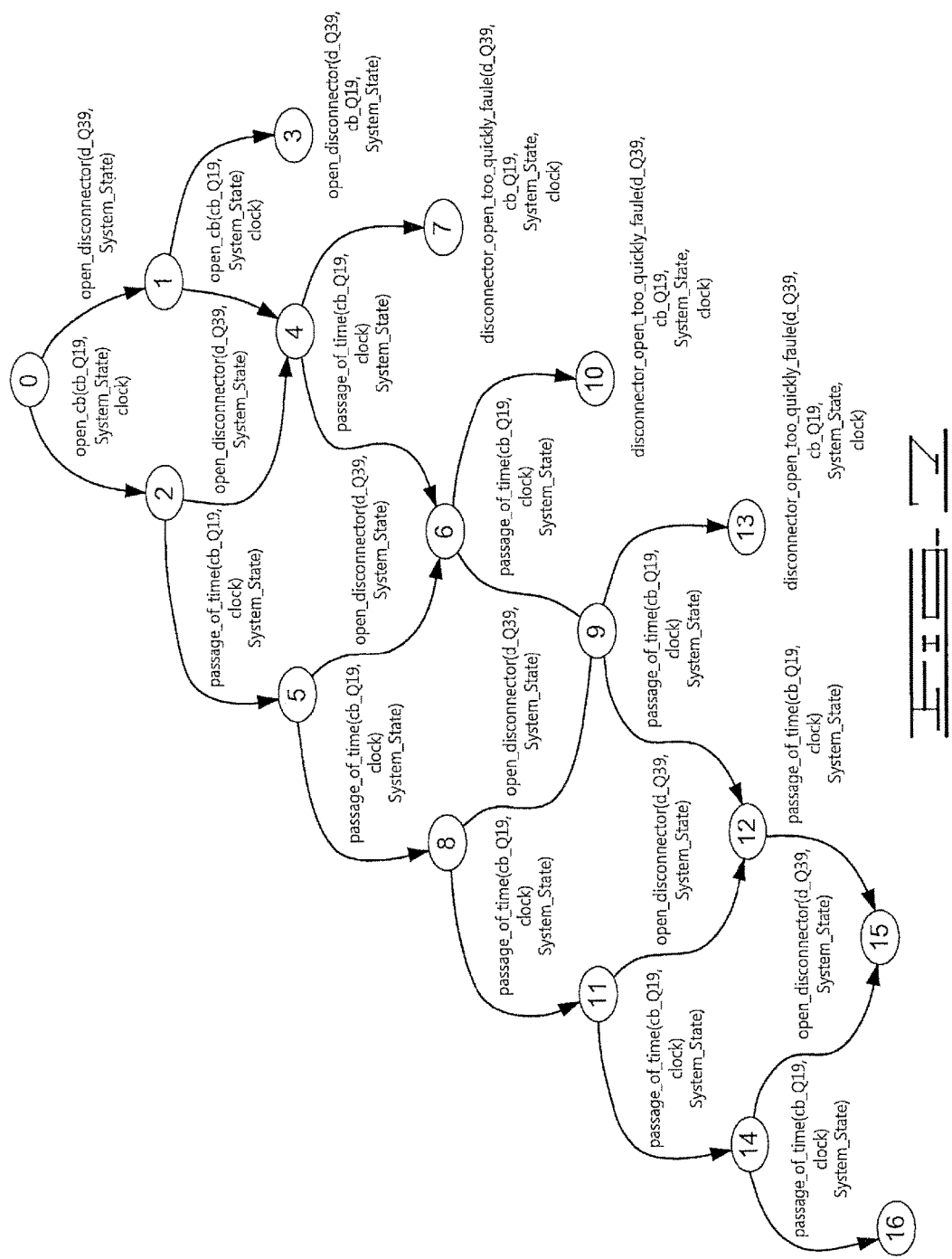
FIG. 7 is a hybrid compliance graph for the electric power substation switching system modeled in the Example.

The network in FIG. 6 was modeled in the hybrid compliance graph generator tool and the hybrid compliance graph (HCG) generated. The resulting HCG is illustrated in FIG. 7. States (see numbers inside circles) 3, 7, 10 and 13 represent fault (electrical arc) states where the proper process to open the circuit breakers and then the disconnectors has not been followed. This example assumes that the disconnector and circuit breaker were closed at the beginning (normal operation) of the example.

There were two possible fault conditions. The first was where the disconnector (Q39) is opened before the breaker (Q19). The second was when the disconnector (Q39) is opened within 2 ms (milliseconds) of the breaker (Q19). The passage of time was modeled by the "passage_of_time" event which advances time 1 ms (millisecond). Here time represents the time since the breaker (Q19) has been opened and was used to determine if the disconnector (Q39) has been opened within 2 ms of the breaker (Q19).

Paths generated from state 0 (starting state, sometimes called the "root") to each of the fault states (3, 7, 10, and 13) describe the set of test conditions that can lead to a fault (electrical arc in this example). Paths that are obtained from this example are listed below.

1. Disconnector Q39 is opened before the breaker Q19 causing an electrical arc. This is a violation of Regulation 1 (disconnector is opened before breaker). This is the State 0 to State 1 to State 3 path.
2. Disconnector Q39 is opened within 2 ms of the breaker Q19 being opened, potentially causing an electrical arc. This is a violation of Regulation 2 (disconnector being opened within 2 ms (milliseconds) of the breaker). There are three possibilities for this case; the first, when the disconnector Q39 is opened 0 ms (milliseconds) after the breaker Q19; the second, when the disconnector Q39 is opened 1 ms (millisecond) after the breaker Q19; and the third, when the disconnector Q39 is opened 2 ms (milliseconds) after the breaker Q19. This case investigates the first possibility, disconnector Q39 is opened 0 ms (milliseconds) after the breaker Q19. There are two possible paths to trigger this fault.
   a. The first path is the State 0 to State 2 to State 4 to State 7 path.
   b. The second path is the State 0 to State 1 to State 4 to State 7 path.
3. Disconnector Q39 is opened within 2 ms of the breaker Q19 being opened, potentially causing an electrical arc. This is a violation of Regulation 2 (disconnector being opened within 1 ms (millisecond) of the breaker). This is similar to case 2, but the disconnector Q39 is opened 1 ms (millisecond) after the breaker Q19. There are three possible paths to trigger this fault.
   a. The first path is the State 0 to State 1 to State 4 to State 6 to State 10 path.
   b. The second path is the State 0 to State 2 to State 4 to State 6 to State 10 path.
   c. The third path is the State 0 to State 2 to State 5 to State 6 to State 10 path.
4. Disconnector Q39 is opened within 2 ms of the breaker Q19 being opened, potentially causing an electrical arc. This is a violation of Regulation 2 (disconnector being opened within 2 ms (milliseconds) of the breaker). This is similar to case 2, but the disconnector Q39 is opened 2 ms (milliseconds) after the breaker Q19. There are four possible paths to trigger this fault.
   a. The first path is the State 0 to State 1 to State 4 to State 6 to State 9 to State 13 path.
   b. The second path is the State 0 to State 2 to State 4 to State 6 to State 9 to State 13 path.
   c. The third path is the State 0 to State 2 to State 5 to State 6 to State 9 to State 13 path.
   d. The fourth path is the State 0 to State 2 to State 5 to State 8 to State 9 to State 13 path.

The causes of the faults result from violation of one of the two regulations stated above. The root cause of either fault could be from an attacker intentionally modifying the system, through normal operation by legitimate personnel using a flawed procedure, or through incorrect operation (or execution of a procedure) by legitimate personnel. The last two cases can be grouped together as non-attacker (non-security) causes. This method applies to faults caused by an intentional attacker and those caused by non-attackers (non-security). Thus, this method can be used to assess security properties, and compliance with regulations and safety practices.

Although the disclosed invention has been shown and described in detail with respect to a preferred embodiment, it will be understood by those skilled in the art that various changes in the form and detailed area may be made without departing from the spirit and scope of this invention as claimed. Thus, while the present invention is well adapted to carry out the object and advantages mentioned as well as those inherent therein, numerous changes may be made by those skilled in the art and such changes are encompassed within the spirit of this invention as defined by the appended claims.

What is claimed is:

1. A method of adjusting a cyber-physical system having a plurality of components with at least one of said components being a digital component and at least one of said components being a physical component, said method comprising:
   (a) describing each of said plurality of components and defining at least one compliance penalty as a quality associated with at least one component of said plurality of components wherein said compliance penalty results from said at least one component being noncompliant with a compliance requirement;
   (b) defining an initial state for said cyber-physical system;
   (c) generating a set of paths, wherein each path comprises at least one event necessary for transition from said initial state to an end state, which transition can include passage through one or more intermediate states in transit from said initial state to said end state, and wherein said at least one event is indicative of how actions and time can alter said initial state or said one or more intermediate states;
   (d) identifying a set of violation paths from said set of paths where each violation path contains at least one violation state in which said at least one component is noncompliant with said compliance requirement;
   (e) identifying said compliance penalty associated with said violation state; and
   (f) adjusting said cyber-physical system to prevent said at least one component becoming noncompliant by one of said violation paths and thus preventing said compliance penalty.

2. The method of claim 1, wherein said step (d) further comprises identifying whether one of said violation paths is associated with said physical component being noncompliant with said compliance requirement and in step (f) said cyber-physical system is adjusted to prevent said physical component from being noncompliant by one of said violation paths.

3. The method of claim 2, wherein said at least one compliance penalty is a quality associated with said physical component.

4. The method of claim 3 wherein said adjusting of said cyber-physical system includes at least one of upgrading or replacing one or more of said components or changing a connection of said components.

5. The method of claim 4 wherein said compliance penalties are selected from said group consisting of fines, regulatory penalties, legal sanctions and shutdowns of the cyber-physical system.

6. The method of claim 5 wherein said compliance requirements are selected from said group consisting of safety requirements, maintenance requirements and regulatory requirements.

7. The method of claim 6 wherein said steps (c) through (e) are computer implemented steps.

8. The method of claim 7 wherein steps (a) and (b) include constructing a compliance requirement model for said cyber-physical system that is used in generating said set of paths in step (c).

9. The method of claim 8 wherein step (a) further comprises defining at least one operational rule as an event and at least one compliance violation as an event.

10. The method of claim 1 further comprising generating test scripts from said paths identified in step (d).

11. The method of claim 1 wherein step (a) further comprises identifying at least one test condition as one of said at least one events wherein said at least one test condition is associated with a compliance test for said cyber-physical system and wherein said method further comprises determining whether said test condition is valid based on determining whether one of the violation paths is associated with said compliance test.

12. A method of systematically identifying compliance issues in a cyber-physical system having a plurality of components, with at least one of said components being a digital component and at least one of said components being a physical component said method comprising:
  (a) constructing a compliance requirement model for said cyber-physical system including describing each of said plurality of components, defining at least one compliance penalty as a quality associated with at least one component of said plurality of components, defining at least one operational rule as an event, and defining at least one compliance violation as an event, wherein said compliance penalty results from said at least one component being noncompliant with a compliance requirement, wherein said compliance penalties are selected from said group consisting of fines, regulatory penalties, legal sanctions and shutdowns of the cyber-physical system, and wherein said compliance requirements are selected from said group consisting of safety requirements, maintenance requirements and regulatory requirements;
  (b) defining an initial state for said cyber-physical system;
  (c) performing the following computer implemented steps:
    (i) generating a set of paths utilizing said compliance requirement model, wherein each path comprises at least one event necessary for transition from said initial state to an end state, which transition can include passage through one or more intermediate states in transit from said initial state to said end state, and wherein said at least one event is indicative of how actions and time can alter said initial state or said one or more intermediate states;
    (ii) identifying a set of violation paths from said set of paths where each violation path contains at least one violation state in which said at least one component is noncompliant with said compliance requirement; and
    (iii) identifying said compliance penalty associated with said violation state; and
  (d) adjusting said cyber-physical system to prevent said at least one component becoming noncompliant by one of said violation paths and thus preventing said compliance penalty, and wherein said adjustments include at least one of upgrading or replacing one or more of said components or changing a connection of said components.

13. The method of claim 12, wherein said step (c)(ii) further comprises identifying whether one of said violation paths is associated with said physical component being noncompliant with said compliance requirement and in step (d) said cyber-physical system is adjusted to prevent said physical component from being noncompliant by said one of said violation paths.

14. The method of claim 13, wherein said at least one compliance penalty is a quality associated with said physical component.

* * * * *